United States Patent [19]

Yamada et al.

[11] Patent Number: 5,540,998
[45] Date of Patent: Jul. 30, 1996

[54] SOLAR HEAT-SHIELDING COATING COMPOSITION AND COATED STRUCTURE

[75] Inventors: Naofusa Yamada; Hatsuo Inagaki, both of Kisarazu; Hironobu Kawasaki, Machida, all of Japan

[73] Assignee: Nippon Steel Chemical Co. Ltd., Tokyo, Japan

[21] Appl. No.: 302,768
[22] PCT Filed: Mar. 19, 1992
[86] PCT No.: PCT/JP92/00344
§ 371 Date: Nov. 30, 1994
§ 102(e) Date: Nov. 30, 1994
[87] PCT Pub. No.: WO93/19134
PCT Pub. Date: Sep. 30, 1993
[51] Int. Cl.$^6$ ..................................................... B32B 9/04
[52] U.S. Cl. .................. 428/411.1; 428/543; 523/125; 523/135; 523/440
[58] Field of Search ....................... 523/125, 135, 523/440; 428/411.1, 543

[56] References Cited

U.S. PATENT DOCUMENTS

| | | | |
|---|---|---|---|
| 3,577,379 | 5/1971 | Sandler et al. | 260/40 |
| 3,971,873 | 7/1976 | Price | 260/899 |
| 4,157,265 | 6/1979 | Papenfuhs et al. | 106/288 |
| 4,272,291 | 6/1981 | Shtern et al. | 524/407 |
| 4,310,596 | 1/1982 | Van Buskirk | 524/407 |
| 4,426,465 | 1/1984 | Maki et al. | 524/407 |
| 4,435,220 | 3/1984 | Watanabe et al. | 106/291 |
| 5,154,168 | 10/1992 | Yamada et al. | 106/450 |
| 5,213,932 | 5/1993 | Shimzaki | 430/106 |
| 5,216,081 | 6/1993 | Mohri et al. | 525/199 |

FOREIGN PATENT DOCUMENTS

| | | |
|---|---|---|
| 55-74862 | 6/1980 | Japan . |
| 55-33828 | 9/1980 | Japan . |
| 55-120669 | 9/1980 | Japan . |
| 56-109257 | 8/1981 | Japan . |
| 1-121371 | 5/1989 | Japan . |
| 1-263163 | 10/1989 | Japan . |
| 2-185572 | 7/1990 | Japan . |

OTHER PUBLICATIONS

Martin "Colour and Methods of Colour Reproduction" Blackie and Son Limited, 1923, pp. 14–38.

*Primary Examiner*—John C. Bleutge
*Assistant Examiner*—Randy Gulakowski
*Attorney, Agent, or Firm*—Nikaido, Marmelstein, Murray & Oram LLP

[57] ABSTRACT

This invention relates to a solar heat-shielding coating composition which consists mainly of two kinds or more of pigments selected from red, orange, yellow, green, blue and purple pigments in such a manner as to yield a color of low lightness, particularly achromatic black, by additive mixture and a weather-resistant vehicle and a structure covered with said coating composition, with the composition capable of covering the outside of said structure exposed directly to the sun and suppressing a rise in the inside temperature.

2 Claims, 1 Drawing Sheet

SOLAR HEAT-SHIELDING COATING COMPOSITION AND COATED STRUCTURE

FIELD OF TECHNOLOGY

This invention relates to a solar heat-shielding coating composition and a coated structure and, more particularly, to a coating composition which is suitable for covering ocean structures, decks and tanks of ships, outdoor structures such as cylindrical or spherical tanks, buildings such as houses, commercial offices, warehouses and gymnasiums, outdoor structures such as automobiles, tank lorries, and cold-storage containers and home electrical appliances such as refrigerators to keep the inside temperature from rising by direct rays of the sun, to enhance the effects of air conditioning or refrigeration and to realize saving in energy or prevent evaporation of the volatile components of oils and also to a structure coated therewith.

BACKGROUND TECHNOLOGY

There has been a strong demand for saving of the air-conditioning cost of buildings by preventing an increase of the inside temperature caused by the solar rays, for reducing the evaporation loss of volatiles from oil tankers, natural gas transport ships, and tanks installed on land by coating the outer surface of these facilities and for improving refrigerating efficiency of tanks and home electrical appliances. For example, the loss of crude oils by evaporation from tankers is enormous and it is said to amount to 0.2 to 0.5% of the total load in one voyage from the Near East or the Middle East to Japan.

To deal with the above-mentioned problems, white pigments such as titanium oxide and colored pigments have hitherto been used in solar heat-shielding coatings. Coloring in white produces a solar heat-shielding effect to some extent, but coloring in other than white leads to a marked reduction of this effect. In consequence, there is a demand for availability of coating compositions in any desired color of a good solar heat-shielding effect.

On the other hand, aluminum paints containing scaly aluminum powders have been known as solar heat-shielding coatings for the roofs of buildings and the outer surface of tanks. These paints are available in a limited number of colors and do not possess sufficient durability and, besides, they are not suitable for the places to be walked on because of their poor abrasion resistance.

Heat-reflective enamels containing antimony trioxide, antimony dichromate, alkali metal dichromates and the like are proposed in Japan Kokai Tokkyo Koho No. Sho 56-109, 257 (1981) to solve the above-mentioned problems. They are, however, not desirable from the viewpoint of environmental sanitation as they contain heavy metals.

Processes for the manufacture of metal plates covered with emulsion coatings containing fine glass powders with a particle diameter of 20 to 350 μm, coatings containing synthetic silica powders and white pigments with a particle diameter of 300 μm or less or coatings containing ground glass with a particle diameter of 5 to 300 μm are proposed in Japan Tokkyo Koho No. Sho 55-33,828 (1980) and Japan Kokai Tokkyo Koho Nos. 55-120,669 (1980) and 55-74,862 (1980). Theses coatings exhibit an excellent solar heat-shielding effect in the initial stage, but they suffer a marked loss of this effect with the passage of time as they have an uneven texture on their surface and show poor long-term antisoiling properties. Hence, it was difficult for this type of coatings to be safe and colorable in any desired color and to maintain the solar heat-shielding effect for an extended period of time.

Such being the case, the present inventors already proposed in Japan Kokai Tokkyo Koho No. Hei 1-121,371 (1989) that (1) one or more of zirconium oxide, yttrium oxide and indium oxide and (2) compounds of one or more of zirconium oxide, indium oxide, titaniumm oxide and silicon oxide and one or more of magnesium oxide, yttrium oxide, barium oxide, calcium oxide and zinc oxide are substances capable of meeting the above-mentioned property requirements.

The present inventors also proposed in Japan Kokai Tokkyo Koho No. Hei 1-263,163 (1989) to use Si or an alloy or alloys of Si and one or more of Al, Fe, Mg, Mn, Ni, Ti, Cr and Ca with a particle diameter of 50 μm or less as solar heat-shielding pigments for achromatic gray such as Munsell color notation N-2 to N-7. Moreover, they proposed the use of colored pigments based on complex oxides for chromatic color in Japan Kokai Tokkyo Koho No. Hei 2-185,572 (1990). The technologies thus disclosed have made it possible to provide compositions and structures with solar heat-shielding effects for white, achromatic gray, and chromatic color. Coloring in black for which the largest effect is expected, however, requires the use of carbon black, iron black, copper chrome black and the like and this was bound to lower the solar heat-shielding effect.

It is an object of this invention to provide a black coating composition which covers the surface of a variety of structures on land and sea, ships, buildings, and home electrical appliances exposed to direct solar rays to prevent a rise of the inside temperature thereby reducing the air-conditioning cost or loss by evaporation of the contents for a marked saving in energy and is serviceable with long-term durability, free of problems relating to environmental sanitation, and of good appearance and to provide a structure coated therewith.

DISCLOSURE OF THE INVENTION

The present inventors have conducted extensive studies to solve the above-mentioned problems, found that a coating composition containing two kinds or more of red, orange, yellow, green, blue and purpole pigments with a particle diameter of 50 μm or less showing high solar radiation reflectance in the ultraviolet and near infrared regions in such proportion as to yield a color of low lightness, particularly achromatic black, by additive mixture shows excellent long-term durability and effectiveness and arrived at this invention.

Accordingly, of coating compositions mainly consisting of vehicles and pigments, this invention relates to a solar heat-shielding coating composition which comprises a weather-resistant vehicle and a solar heat-shielding pigment consisting of two kinds or more of pigments selected from (A) red pigments with a particle diameter of 50 μm or less showing a solar radiation reflectance of 45% or more in the range of 350 to 2,100 nm calculated from the spectral reflectance (Rλi) as specified in JIS A 5759 for architectural films for shielding heat rays and preventing scattering of shattered glass, (B) orange pigments with a particle diameter of 50 μm or less showing a solar radiation reflectance of 55% or more, (C) yellow pigments with a particle diameter of 50 μm or less showing a solar radiation reflectance of 60% or more, (D) green pigments with a particle diameter of 50 μm or less showing a solar radiation reflectance of 20% or more, (E) blue pigments with a particle diameter of 50 μm or less showing a solar radiation reflectance of 20% or more and (F) purple pigments with a particle diameter of 50 μm or less showing a solar radiation reflectance of 35% or more in such proportion as to yield a color of low lightness, particularly achromatic black, by additive mixture, said pigments accounting for 2 to 60% by weight of the solids in said coating.

This invention also relates to a structure coated for solar heat shielding which comprises a coat of excellent solar heat reflection containing a weather-resistant vehicle and two kinds or more of pigments selected from red, orange, yellow, green, blue and purple pigments with a particle diameter of 50 μm or less in such proportion as to yield a color of low lightness, particularly achromatic black, by additive mixture at least on the outermost layer of the substrate of said structure and a coat mainly consisting of a heat-insulating filler and a vehicle with good adhesiveness and corrosion resistance beneath the aforesaid solar heat-reflecting coat.

This invention will be described in detail below. In this invention, low lightness means an L* value of 35 or less when the color is designated by the CIELAB color system. As long as colors remain in this range of low lightness, they include not only Munsell notation N-1 but also Munsell notation N-2 and N-3, slightly reddish color and greenish color.

A vehicle of excellent weather resistance useful for a coating composition of this invention refers to the one which is durable with excellent yellowing resistance, color retention, gloss retention and chalking resistance and can maintain the heat shielding effect for a prolonged period of time. Vehicles which dry at room temperature may desirably be composed mainly of one or more of acrylic resins, silicone-modified polyesters, alkyd resins, silicone-modified alkyd resins and fluorine-containing resins and combined, as needed, with one or more of hexamethylene diisocyanate or its adducts, isophorone diisocyanate or its adducts, hydrogenated xylylene diisocyanate or its adducts, hydrogenated dicyclohexylmethane diisocyanate or its adducts and tetramethylxylylene diisocyanate or its adducts or they may be composed mainly of acrylic resins having carboxyl group and/or amino group and combined, as needed, with compounds having glycidyl group. Vehicles which are suitable for forced drying may desirably be composed mainly of one or more of polyesters, silicone-modified polyesters, fluorine-containing resins and acrylic resins and combined, as needed, with one or more of blocked isocyanates and melamine resins.

With respect to solar heat-shielding pigments useful for a composition of this invention, it is desirable for said pigments to show, while formulated in a coating, a high solar heat radiation reflectance in the range from 350 to 2,100 nm, particularly outside the range of visible light or below 380 nm and above 780 nm, as calculated from the spectral reflectance (Rλi) specified by JIS A 5759 for architectural films for shielding heat rays and preventing scattering of shattered glass, to be safe and water- and weather-resistant and maintain their heat-shielding effect for a prolonged period of time.

Extensive studies on pigments have indicated that not a black pigment normally used for coatings such as carbon black, iron black and copper chrome black but a pigment of low lightness, particularly achromatic black, obtained by additive mixture of red, orange, yellow, green, blue and purple pigments produces an excellent effect. That is, it is possible to obtain achromatic black by combining two or more of pigments which are located opposite to each other in the hue circle shown in JIS Z 8721 for specification of colors according to their three attributes, for example, by combining red and cyan or yellow and violet. The pigment obtained in this manner is black with practically no reflection in the visible light region with the wavelength ranging from 380 nm to 780 nm but it is black with high reflective radiance (Munsell notation N-1) in the near infrared region from 780 nm and upward.

As a concrete example, it is possible to obtain black of Munsell notation N-1 by a combination of a red pigment based on equinacridone (PV19), a blue pigment based on copper phthalocyanine (PB15:4) and a yellow pigment based on benzimidazolone (PY154). It is also possible to obtain the same N-1 by a combination of a yellow pigment based on isoindoline (PY109) and a purple pigment based on dioxazine (PV23). Each of the pigments thus prepared shows a solar radiation reflectance of 30% or more. Thus, N-1 black can yield an exceptionally large value of solar radiation reflectance compared with 0 to a few percent by carbon black, iron black or copper chrome black.

As described above, the substance of this invention is to prepare a color of low lightness, particularly achromatic black, by additive mixture of red, orange, yellow, green, blue and purple for use in a solar heat-shielding coating composition without using black pigments. Pigments for additive mixture can be chosen in consideration of their hue, weather resistance and color stability.

A red pigment can be chosen from the following pigments identifiable by Pigment Red (PR) and Colour Index Pigment Number (C.I. No.) of Society of Dyers and Colourists: PR3, PR5, PR48, PR58, PR88, PR112, PR122, PR123, PR144, PR149, PR165, PR168, PR170, PR171, PR175, PR177, PR178, PR179, PR187, PR189, PR190, PR194, PR202, PR207, PR209, PR214, PR216, PR224, PR242, PR253, PR254, PR260 and PR351.

An orange pigment can be chosen from the following pigments identifiable by Pigment Orange (PO) and C.I. No.: PO5, PO13, PO16, PO34, PO36, PO38, PO43, PO60, PO62, PO65 and PO69.

A yellow pigment can be chosen from the following pigments identifiable by Pigment Yellow (PY) and C.I. No.: PY1, PY3, PY13, PY14, PY16, PY17, PY24, PY42, PY55, PY73, PY74, PY81, PY83, PY93, PY94, PY95, PY97, PY98, PY105, PY108, PY109, PY110, PY116, PY117, PY120, PY128, PY129, PY130, PY137, PY138, PY139, PY147, PY151, PY153, PY154, PY155, PY165, PY173 and PY175.

A green pigment can be chosen, for example, from PG7, PG 10 and PG36 where PG stands for Pigment Green and the number for C.I. No.

A blue pigment can be chosen, for example, from PB15:1, PB15:2, PB15: 3, PB15:4, PB15:6, PB16 and PB60 where PB stands for Pigment Blue and the number for C.I. No.

A purple pigment can be chosen, for example, from PV19, PV23 and PV257 where PV stands for Pigment Violet and the number for C.I. No.

It is necessary for the above-mentioned solar heat-shielding pigments to have a particle diameter of 50 μm or less, more particularly 10 μm or less, from the standpoint of antisoiling property, weather resistance, and color stability. Very small irregularity forms in the coat when a pigment with a diameter in excess of 50 μm is used. Dusts and soots adhere to the depressions to soil the surface and this makes it difficult to maintain the solar heat-shielding effect.

It is necessary, moreover, that a pigment with the above-mentioned particle diameter must be present to 2 to 60% by weight of the solids in the coating. With less than 2% by weight of such pigment, the coloration becomes insufficient and a thicker coat is required. On the other hand, with more than 60% by weight, an excessive amount of pigment in the coat adversely affects the chalking resistance, which results in poor weather resistance.

The solids in the coating here means substances which do not volatilize or evaporate. They are generally those components which form a coat and, concretely, they are pigments, resins in vehicles, and other additives.

A coating composition of this invention formulated as above is dissolved or dispersed in an organic solvent and adjusted to a suitable viscosity before use. An organic solvent of adequate applicability and drying quality is chosen from hydrocarbons, alcohols, ether alcohols, ethers, esters, ester alcohols and ketones.

It is possible to use, as needed, planarization agents, ultraviolet absorbers, viscosity modifiers, curing catalysts, pigment dispersing agents, pigment sedimentation inhibitors and color segregation inhibitors.

The second substance of this invention is that a coat is formed at least on the outermost layer of a substrate by the above-mentioned coating composition and beneath this coat is formed a coat mainly consisting of a filler of excellent thermal insulation and a vehicle of excellent adhesiveness and corrosion resistance.

A coating composition to be applied to the outermost layer is as described above and an excellent performance is obtained by applying the composition to a thickness of 1 μm or more, preferably 10 μm or more. With a thickness of less than 1 μm, the underlying coat exerts a too strong influence to suppress the full performance of the coat in question. On the other hand, a good effect can be maintained up to a fairly large thickness. Since the effect levels off with an increasing thickness, a thickness of 10 to 100 μm is desirable for the upper limit.

A filler of good thermal insulation to be contained in the underlying coat is preferably a scaly substance and/or a spherical hollow substance. It is possible to use glass flake or mica with a particle diameter of 50 μm or less as a scaly substance.

Scaly metals, for example, stainless steel foils and aluminum foils are on the market, but glass flake and mica are preferable in respect to thermal conductivity. The particle size of a scaly substance is preferably 50 μm or less, more preferably 20 μm or less. With a particle size of more than 50 μm a scaly substance produces unevenness in the coat and adversely affects the overlying coat on the one hand and reduces the effects of thermal insulation and corrosion resistance because of its inability of flat arrangement on the other. With a particle size of 20 μm or less, the ratio of scaly substance to vehicle is set at an appropriate value which allows parallel arrangement of scales and the coat. This results in the formation of a dense layer which lengthens the path of water permeation or produces the so-called labyrinth effect and contributes to improvement of not only the corrosion resistance but also the heat resistance.

It is also possible to use glass balloons, shirasu balloons or balloons of resins such as polystyrene with a particle diameter of 50 μm or less, preferably 1 to 10 μm, as a spherical hollow substance. Balloons with a diameter in excess of 50 μm produce unevenness in the coat and adversely affect the overlying coat as described above. With a diameter of less than 1 μm, the effect of hollowness, namely, the effect of thermal insulation decreases.

A vehicle to be used in the underlying coat consists mainly of one or more of epoxy resins, modified epoxy resins, phenol-modified butyral resins, polyesters, acrylic resins, silicone-modified polyesters, alkyd resins, fluoropolymers and polyurethanes, each with excellent adhesiveness and corrosion resistance, and curing agents, curing accelerators, planarization agents, viscosity modifiers, pigment dispersing agents, pigment sedimentation inhibitors and color segregation inhibitors are used as needed. Examples of curing agents are isocyanate group-containing compounds, amino group-containing compounds and melamine resins.

It is desirable for the coat to contain 2 to 60% by weight of the above-mentioned fillers. The effect of thermal insulation is not obtained with less than 2% of fillers while the coat loses adhesiveness and affects the overlying coat adversely with more than 60% of fillers. It is desirable for the underlying coat to contain 20 to 60% by weight of the above-mentioned vehicle. The adhesiveness of the coat becomes poor with less than 20% of the vehicle while the thermal insulation and corrosion resistance decrease with more than 60% of the vehicle.

As described above, a structure of this invention has a coat of excellent solar heat reflection as the outermost layer and a coat of excellent thermal insulation beneath it. In this case, it is needless to say that the underlying coat can be provided directly on the surface of a structural substrate or a primer may be used between the two in order to improve the adhesion of the two.

Legend

Figure 1:
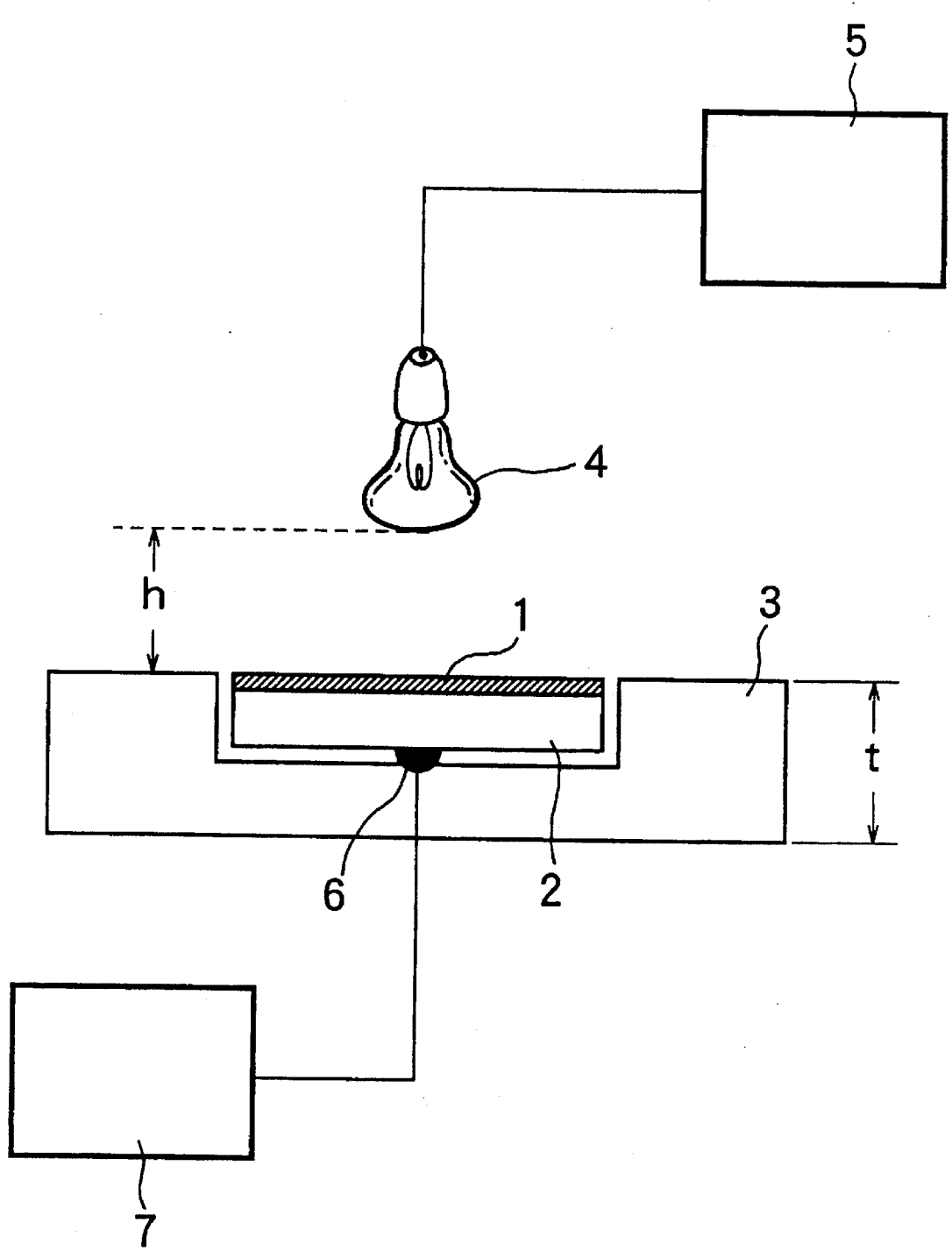
FIG. 1 is a schematic diagram of a device used in the examples for determining the temperature of the reverse side of a specimen.

1Coat
2Steel plate
3Polystyrene foam block
4Incandescent lamp
5Electric power source
6Temperature sensor
7Temperature recorder

PREFERRED EMBODIMENTS OF THE INVENTION

This invention will be described concretely with reference to the accompanying examples and comparative examples.
[Ingredients for Formulation]

① Solar Mat-shielding pigments

Solar heat-shielding pigment A: FASTOGEN SUPER RED 7061B (PV19); average particle diameter 0.3 μm; product of Dainippon Ink and Chemicals, Inc.

Solar heat-shielding pigment B: FASTOGEN SUPER BLUE GNPM-K (PB15:4); average particle diameter 0.1 μm; product of Dainippon Ink and Chemicals, Inc.

Solar heat-shielding pigment C: SYMULER FAST YELLOW 4192 (PY154); average particle diameter (long diameter) 0.4 μm; product of Dainippon Ink and Chemicals, Inc.

Solar heat-shielding pigment D: FASTOGEN GREEN S (PG7); average particle diameter (long diameter) 0.06 μm; product of Dainippon Ink and Chemicals, Inc.

Solar heat-shielding pigment E: IRGAZIN YELLOW 2GLT (PY109); average particle diameter (long diameter) 2.5 μm; product of Ciba-Geigy Solar heat-shielding pigment F: FASTOGEN SUPER VIOLET RN-S (PV23); average particle diameter (long diameter) 0.3 μm; product of Dainippon Ink and Chemicals, Inc.

② Black pigments

Black pigment G: Carbon Black MA-100 (Pigment Black 6); average particle diameter 0.02 μm; product of Mitsubishi Kasei Corporation Black pigment H: Iron Black BL-100 (Pigment Black 11); average particle diameter 3 μm; product of Titan Kogyo K.K.

Black pigment I: Copper Chrome Black Daipyroxide Black #9510 (Pigment Black 28); average particle diameter 0.5 μm; product of Dainichiseika Color & Chemicals Mfg. Co., Ltd.

③ White pigments

Tipaque CR-90 (average particle diameter 0.4 μm); product of Ishihara Sangyo Kaisha, Ltd.

④ Scaly substances

Mica powders MP-325 (average particle diameter 15 μm); product of Okabe Mica Co., Ltd.

⑤ Spherical hollow substances Silica balloons QCEL300 (average particle diameter 5 μm); product of Asahi Glass Co., Ltd.

[Preparation of coatings]

① Acrydic A-801P (acrylic polyol resin manufactured by Dainippon Ink and Chemicals, Inc.) was used as vehicle in the proportion shown in Table 1 and it was mixed with a solar heat-shielding pigment, dispersed in a 1:1 mixture of xylene and methyl isobutyl ketone for 20 minutes and adjusted to 20 to 30 poises. Takenate D-170N (hexamethylene diisocyanate adduct manufactured by Takeda Chemical Industries, Ltd.) was added at the time of application in such a manner as to make the mol ratio NCO/OH equal to 1/1 to prepare Coatings 1, 2, 3 and 4.

② Acrydic A-801P (acrylic polyol resin manufactured by Dainippon Ink and Chemicals, Inc.) was used as vehicle in the proportion shown in Table 1 and it was mixed with a white pigment, a scaly substance and a spherical hollow substance, then mixed with black pigment G until the hue became N-7, dispersed in a 1:1 mixture of xylene and methyl isobutyl ketone for 20 minutes and adjusted to 20 to 30 poises. Takenate D-170N (hexamethylene diisocyanate adduct manufactured by Takeda Chemical Industries, Ltd.) was added at the time of application in such a manner as to make the mol ratio NCO/OH equal to 1/1 to prepare Undercoats 8 and 9.

③ Coatings 5, 6 and 7 were prepared as in ① except using black pigments G, H and I in place of the solar heat-shielding pigment.

Preparation of test specimens A 1 mm-thick soft steel sheet was coated by spraying with Coating 8 or 9 to a dry thickness of 150 μm, dried at 20° C. for 1 day, then coated by spraying with Coating 1, 2, 3, 4, 5, 6 or 7 to a dry thickness of 50 μm and dried for 2 weeks to prepare a test specimen.

[Method of testing]

The specimen was irradiated with an incandescent lamp as shown in FIG. 1 and the temperature of the specimen at the reverse side was determined. The results are shown in Table 2.

With reference to FIG. 1, the procedure for determining this temperature is as follows. A steel sheet 2 (measuring 150×70×1 mm) having a coat 1 is fitted into a polystyrene foam block 3 having a thickness (t) of 30 mm with the coat 1 facing upward. An incandescent lamp 4 (500-w photoreflector lamp) is installed at a position 370 mm above the coated surface or h=370 mm and is connected to an electric power source 5. A temperature sensor 6 is attached to the reverse side of the steel sheet and connected to a temperature recorder 7. The incandescent lamp 4 is lighted while keeping the room temperature at 20°± 1° C. and adjusting the voltage of the power source 5 at 70±1 V and the temperature of the temperature sensor 6 is recorded by the temperature recorder 7.

TABLE 1

| Coating No. | Proportion of solids (% by weight) | | | Hue (Munsell) | L* | Solar radiation reflectance (%) |
|---|---|---|---|---|---|---|
| 1 | Vehicle | | 50 | N-1 | 25 | 32 |
|   | Solar heat -shielding pigment | A B C | 2.5 1.5 6.0 | | | |
| 2 | Vehicle | | 50 | N-1 | 25 | 34 |
|   | Solar heat -shielding pigment | A B C | 4 1.5 4.5 | | | |
| 3 | Vehicle | | 50 | N-1 | 25 | 24 |
|   | Solar heat -shielding pigment | A C D | 3 1 6 | | | |
| 4 | Vehicle | | 50 | N-1 | 25 | 30 |
|   | Solar heat -shielding pigment | E F | 7 3 | | | |
| 5 | Vehicle | | 50 | N-1 | 25 | 0 |
|   | Black pigment G | | 5 | | | |
| 6 | Vehicle | | 50 | N-1 | 25 | 0 |
|   | Black pigment H | | 10 | | | |
| 7 | Vehicle | | 50 | N-1 | 25 | 2 |
|   | Black pigment I | | 10 | | | |

TABLE 1-continued

| Coating No. | Proportion of solids (% by weight) | | Hue (Munsell) | L* | Solar radiation reflectance (%) |
|---|---|---|---|---|---|
| 8 | Vehicle | 50 | N-7 | 74 | — |
|   | White pigment | 25 | | | |
|   | Scaly substance | 25 | | | |
| 9 | Vehicle | 50 | N-7 | 74 | — |
|   | White pigment | 40 | | | |
|   | Spherical hollow substance | 10 | | | |

TABLE 2

| | Top-coat No. | Under-coat No. | Test results Reverse side temperature (°C.) | |
|---|---|---|---|---|
| | | | Initial | After one-year exposure |
| Example 1 | 1 | 8 | 73 | 73 |
| Example 2 | 2 | 8 | 72 | 73 |
| Example 3 | 3 | 8 | 78 | 79 |
| Example 4 | 4 | 9 | 75 | 74 |
| Comparative example 1 | 5 | 8 | 96 | 96 |
| Comparative example 2 | 6 | 8 | 95 | 95 |
| Comparative example 3 | 7 | 9 | 93 | 94 |

INDUSTRIAL APPLICABILITY

As is apparent from the examples cited above, the temperature on the reverse side of the specimen indicates a marked heat-shielding effect. This invention thus contributes significantly to the progress of industries by making it possible to provide a solar heat-shielding coating composition which is applicable to the surface of ships and a variety of structures exposed directly to the sun to block the solar heat for a prolonged period of time, suppress the rise of inside temperature, reduce the cost of air conditioning and suppress losses by evaporation of the contents for an expected effect of considerable energy saving and also to provide a structure coated therewith.

What is claimed is:

1. A solar heat-shielding coating composition which comprises a weather-resistant vehicle and 2 to 60% by weight based on solids in the coating of a solar heat-shielding pigment consisting of two kinds or more of pigments selected from (A) red pigments with a particle diameter of 50 μm or less showing a solar radiation reflectance of 45% or more in the range from 350 to 2,100 nm as calculated from the spectral reflectance (R λi) specified by JIS A5759 for architectural films for shielding heat rays and preventing scattering of shattered glass, (B) orange pigments with a particle diameter of 50 μm or less showing the aforesaid solar radiation reflectance of 55% or more, (C) yellow pigments with a particle diameter of 50 μm or less showing the aforesaid solar radiation reflectance of 60% or more, (D) green pigments with a particle diameter of 50 μm or less showing the aforesaid solar radiation reflectance of 20% or more, (E) blue pigments with a particle diameter of 50 μm or less showing the aforesaid solar radiation reflectance of 20% or more and (F) purple pigments with a particle diameter of 50 μm or less showing the aforesaid solar radiation reflectance of 35% or more in such proportion as to yield achromatic black of Munsell notation N-1 by additive mixture.

2. A solar heat-shielding coating composition described in claim 1 wherein said pigments selected from (A) to (F) are such as to yield achromatic black by additive mixture.

* * * * *